United States Patent
Shaffer et al.

(10) Patent No.: US 8,494,548 B2
(45) Date of Patent: Jul. 23, 2013

(54) SUPPORTING COMMUNICATION AMONG ENDPOINTS IN A GEOGRAPHICAL AREA

(75) Inventors: Shmuel Shaffer, Palo Alto, CA (US); Ramanathan T. Jagadeesan, San Jose, CA (US); Bich T. Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1289 days.

(21) Appl. No.: 11/942,748

(22) Filed: Nov. 20, 2007

(65) Prior Publication Data
US 2009/0131085 A1  May 21, 2009

(51) Int. Cl.
*H04W 24/00* (2009.01)

(52) U.S. Cl.
USPC .................. 455/456.1; 455/518; 455/519

(58) Field of Classification Search
USPC ... 455/456.1, 518, 519; 379/202.01; 370/260, 370/261
See application file for complete search history.

(56) References Cited

U.S. PATENT DOCUMENTS

| | | | |
|---|---|---|---|
| 5,828,839 A | 10/1998 | Moncreiff | 395/200.34 |
| 6,978,002 B1 * | 12/2005 | Cope et al. | 379/202.01 |
| 2006/0047825 A1 * | 3/2006 | Steenstra et al. | 709/229 |
| 2007/0201376 A1 * | 8/2007 | Marshall-Wilson | 370/252 |

OTHER PUBLICATIONS

Book, Betsy, "Moving Beyond the Game: Social Virtual Worlds", State of Play 2 Conference, Cultures of Play Panel, http://www.virtualworldsreview.com/info, pp. 1-13, Oct. 2004.
"What is a Virtual World", Virtual Worlds Review, http://www.virtualworldsreview.com/info/whatis.shtml, 2 pages, Printed Nov. 13, 2007.

* cited by examiner

*Primary Examiner* — Manpreet Matharu
(74) *Attorney, Agent, or Firm* — Baker Botts L.L.P.

(57) ABSTRACT

In one embodiment, a method includes receiving a request message from a requesting endpoint, where the request message requests a communication session corresponding to an area. An area-based group comprising one or more endpoints associated with the area is identified. The area-based group allows the endpoints to communicate with each other in the communication session. The requesting endpoint is added to the area-based group to allow the requesting endpoint to communicate with the one or more endpoints in the communication session.

18 Claims, 1 Drawing Sheet

SUPPORTING COMMUNICATION AMONG ENDPOINTS IN A GEOGRAPHICAL AREA

TECHNICAL FIELD

The present disclosure relates generally to communication networks.

BACKGROUND

Endpoints may be placed into groups that allow communication among the endpoints. For example, endpoints may be placed into groups for conference calls, chat rooms, or instant messaging (IM) sessions. The groups may allow the endpoints to communicate via voice, text, or instant messages. In certain circumstances, however, the groups do not satisfactorily organize the endpoints.

DESCRIPTION OF EXAMPLE EMBODIMENTS

Overview

In one embodiment, a method includes receiving a request message from a requesting endpoint, where the request message requests a communication session corresponding to an area. An area-based group comprising one or more endpoints associated with the area is identified. The area-based group allows the endpoints to communicate with each other in the communication session. The requesting endpoint is added to the area-based group to allow the requesting endpoint to communicate with the one or more endpoints in the communication session.

Description

Figure 1:
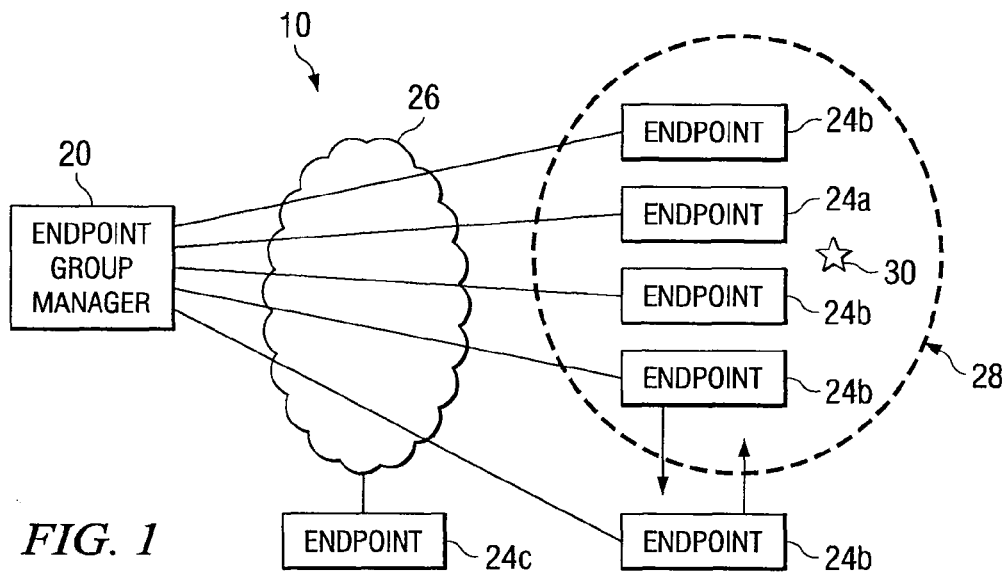
FIG. 1 illustrates an example system for supporting communication among endpoints in an area.

FIG. 1 illustrates an example system 10 for supporting communication among endpoints 24 in an area 28. According to the embodiment, system 10 includes group manager 20, endpoints 24, and a network 26 coupled as shown.

In the embodiment, a requesting endpoint 24a may request from group manager 20 a communication session with an area-based group that includes endpoints 24b in an area 28. The area-based group may be selected for requesting endpoint 24a in any suitable manner. For example, the area-based group may be selected according to the location of requesting endpoint 24a. As another example, requesting endpoint 24a may request the area-based group associated with a landmark 30 such as a highway, restaurant, or theater.

According to the illustrated embodiment, system 10 provides communication sessions to endpoints 24. A communication session refers to an active communication of information between endpoints 24. Information may refer to voice, data, text, audio, video, multimedia, control, signaling, and/or other information. Information may be communicated via telephone call, user messages, and/or other conveyance. Examples of user messages include instant messages, email messages, web log messages, multimedia messages, text messages (such as Short Message Service (SMS) messages), and voicemail messages.

System 10 may utilize communication protocols and technologies to provide the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, and/or other standards.

Endpoint 24 represents any suitable device operable to communicate with system 10. Examples of endpoints 24 include telephones (such as cellular telephones), personal digital assistants, computers, mobile handsets, or any other device operable to communicate with system 10.

In the illustrated embodiment, endpoints 24 include requesting endpoint 24a and endpoints 24b of an area-based group. Requesting endpoint 24a sends a request message requesting a communication session with the group to group manager 20. Requesting endpoint 24a may be inside of area 28 or outside of area 28.

Endpoints 24b of an area-based group are associated with area 24. Endpoints 24b may be inside of area 28 or may have some other connection with area 28. For example, an endpoint 24b may be moving towards or away from area 28. The group may be preconfigured or dynamic. For example, the group may have generally the same endpoints 24 or may have different endpoints 24 as endpoints 24 move in and out of area 28. An endpoint 24c that is not a member of the area-based group does not participate in communication sessions of the group.

Area 28 represents any suitable geographical area with any suitable size or shape. An area 28 may be designated in a suitable manner. Area 28 may be designated by a location, for example, geographical coordinates, an address (includes a street number, street name, city, state, and/or postal code), and/or other location. Area 28 may be designated by a landmark 30, for example, a business (such as a restaurant, theater, or store), a street (such as a highway), a building (such as a government building or historical site), and/or other landmark.

Area 28 may be given by a center point or line (such as a location or landmark 30) and a distance away from the center point or line. For example, area 28 may be given by "the United States Capitol and a one mile radius away from the Capitol." An area-based group identifier uniquely identifies an area-based group, and may comprise a location or landmark. For example, "the United States Capitol group" may identify the group in the previous example.

Area-based groups allow requesting endpoint 24a to communicate with endpoints 24b in a particular area 28. For example, requesting endpoint 24a may communicate with endpoints 24b in area 28 designated by a highway to ask about traffic conditions on the highway. As another example, requesting endpoint 24a may communicate with endpoints 24b at a restaurant to ask about the waiting time for the restaurant. As another example, requesting endpoint 24a may communicate with endpoints 24b at a theater to ask about a movie showing at the theater.

Group manager 20 manages area-based groups, identifies a group requested by requesting endpoint 24a, and allows requesting endpoint 24a to join the requested group. Group manager 20 is described in more detail with reference to FIG. 2.

Network 26 allows components such as endpoint 24 to communicate with other endpoints 24. A communication network may comprise all or a portion of one or more of the following: a mobile communication network (for example, a cellular network), a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, and/or other suitable communication link.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server) and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of group manager 20 may be performed by more than one component. Additionally, operations of system 10 may be performed using any suitable logic. As used in this document, "each" refers to each member of a set or each member of a subset of a set.

Figure 2:
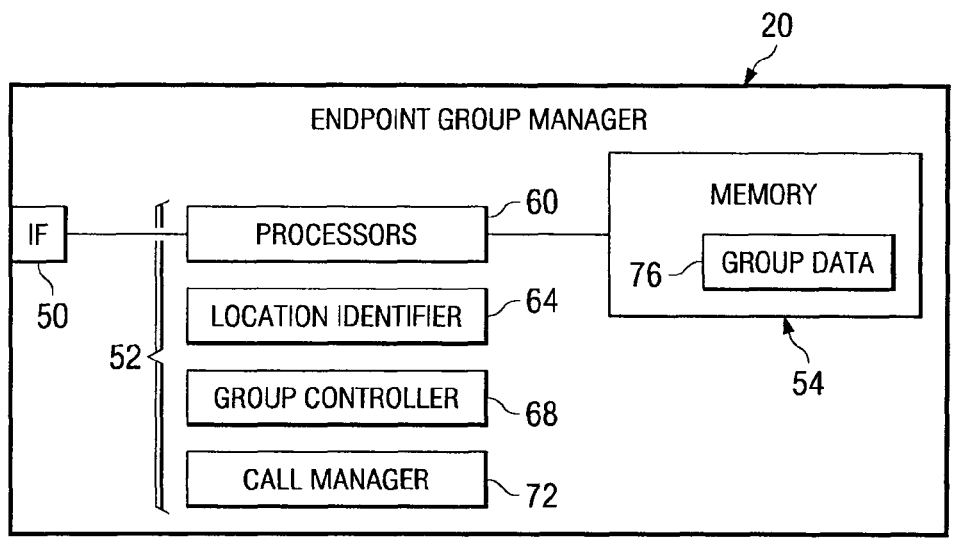
FIG. 2 illustrates an example group manager that may be used with the system of FIG. 1.

FIG. 2 illustrates one embodiment of group manager 20 that may be used with system 10 of FIG. 1. Group manager 20 manages area-based groups, identifies a group requested by requesting endpoint 24a, and allows requesting endpoint 24a to join the requested group.

In the illustrated embodiment, group manager 20 includes an interface 50, logic 52, and a memory 54 coupled as shown. Logic 52 includes one or more processors 60, a location identifier 64, a group controller 68, and a call manager 72 coupled as shown. Memory 54 stores area-based group data 76.

Location identifier 64 identifies the location of requesting endpoint 24a. The location may be identified in any suitable manner. As an example, the location may be identified by a Global Positioning System (GPS). As another example, the location may be identified according to a base station used by requesting endpoint 24a. As another example, the location may be identified subscriber information (such as address) of requesting endpoint 24a.

Group controller 68 manages area-based groups. The operation of group controller 68 depends on the type of communication. For example, group controller 68 may operate as a chat room controller for a chat room, a message depository for a messaging system, or a conference call controller for a conference call.

Group controller 68 also identifies a group requested by requesting endpoint 24a. The group may be identified in any suitable manner. As an example, the request message includes a group identifier (such as a location and/or landmark) that group controller 68 uses to identify the area-based group. As another example, location identifier 64 determines the location of the requesting endpoint, and group controller 68 identifies the area-based group associated with the location.

Group controller 68 determines whether requesting endpoint 24a can join the requested group. The determination may be made according to policies of the group. The policies may designate that only certain endpoints 24 (for example, only endpoints 24 in area 28), only a certain number (for example, no more than ten endpoints 24), or only certain types of endpoints (for example, only cell phones) may join. Group controller 68 notifies call manager 72 that requesting endpoint 24a can join the group.

Call manager 72 adds requesting endpoint 24a to join the requested group. Requesting endpoint 24a may be added in any suitable manner. As an example, endpoint 24a may be added to access messages of the communication session. As another example, endpoint 24a may be added to access a conference call of the communication session.

Group controller 68 stores data 76 describing area-based groups in memory 54. Data 76 may include identifiers of endpoints 24b of groups, group identifiers (such as locations and/or landmarks), and/or policies of groups.

Modifications, additions, or omissions may be made to group manager 20 without departing from the scope of the invention. The components of group manager 20 may be integrated or separated. Moreover, the operations of group manager 20 may be performed by more, fewer, or other components. For example, the operations of location identifier 64 and group controller 68 may be performed by one component, or the operations of group controller 68 may be performed by more than one component. Additionally, operations of group manager 20 may be performed using any suitable logic.

Figure 3:
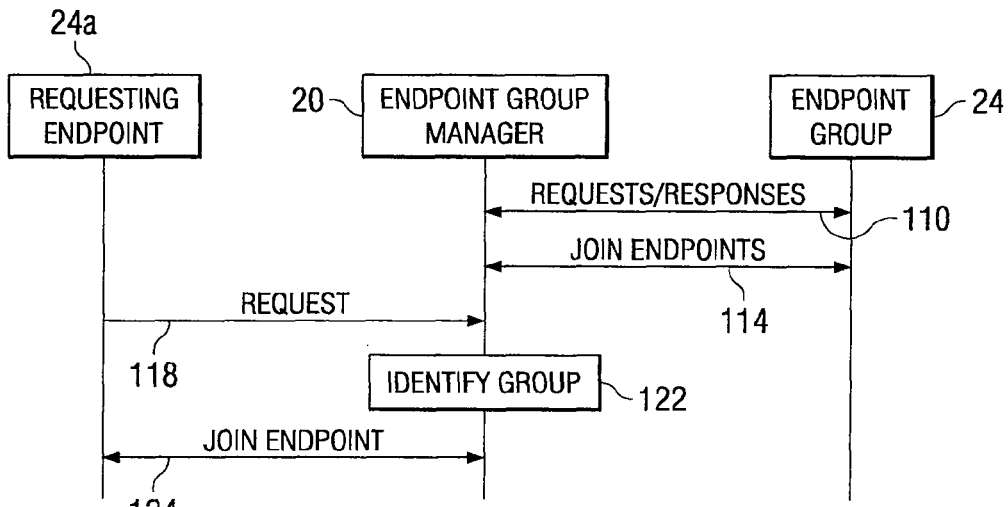
FIG. 3 illustrates an example method for supporting communication among endpoints in an area.

FIG. 3 illustrates one embodiment of a method for supporting communication among endpoints 24 in area 28. The method may be performed by system 10 of FIG. 1. The method begins at step 110, where group manager 20 exchanges requests and responses with endpoints 24b in area 28. Endpoints 24b request to join the area-based group corresponding to area 28, and group manager 20 responds to the requests. Endpoints 24b are joined to the group at step 114.

Requesting endpoint 24a sends a request message to join an area-based group to group manager 20 at step 118. The requested group is identified at step 122. For example, location identifier 64 identifies the location of requesting endpoint 24a, and group controller 68 identifies the group associated with the location. Requesting endpoint 24a is added to the group at step 124. For example, call manager 72 adds requesting endpoint 24a to the group. After adding the requesting endpoint 24a, the method ends.

Modifications, additions, or omissions may be made to the method without departing from the scope of the invention. The method may include more, fewer, or other steps. Additionally, steps may be performed in any suitable order. For example, location identifier 64 may detect that endpoint 24a has entered area 28. Group manager 20 may then send an invitation to endpoint 24a inviting endpoint 24a to join the group. Endpoint 24a may then send the request message to join the group in response to the invitation.

Certain embodiments of the invention may provide one or more technical advantages. A technical advantage of one embodiment may be that a requesting endpoint requests a communication session with an area-based group that includes endpoints in a particular area. Accordingly, the endpoint may readily communicate with other endpoints that are in the area.

Another technical advantage of one embodiment may be that the area-based group may be selected for the requesting endpoint in any suitable manner. For example, the area-based group may be selected according to the location of the requesting endpoint. As another example, the requesting endpoint may request the area-based group associated with a landmark such as a highway, restaurant, or theater.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
   receiving at an endpoint group manager a request message from a requesting endpoint moving towards an area, the request message requesting a communication session corresponding to the area;
   identifying, by the endpoint group manager, the area towards which the endpoint is moving according to a Global Positioning System (GPS);
   identifying, by the endpoint group manager, an area-based group associated with the area identified according to the GPS, the area-based group comprising one or more endpoints moving towards the area, the area-based group allowing the one or more endpoints to communicate with each other in the communication session;
   adding the requesting endpoint to the area-based group to allow the requesting endpoint to access one or more messages of a message repository of the one or more endpoints in the communication session;
   determining that the requesting endpoint has entered the area; and
   sending an invitation to the requesting endpoint, the invitation inviting the requesting endpoint to join the area-based group.

2. The method of claim 1, wherein the area-based group corresponds to a location.

3. The method of claim 1, wherein the area-based group corresponds to a landmark.

4. The method of claim 1, wherein identifying the area-based group comprising the one or more endpoints associated with the area further comprises:
   identifying the area-based group from a group identifier included in the request.

5. The method of claim 1, wherein identifying the area-based group comprising the one or more endpoints associated with the area further comprises:
   determining that the requesting endpoint is at a location; and
   identifying the area-based group associated with the location.

6. The method of claim 1, wherein adding the requesting endpoint to the area-based group further comprises:
   allowing the requesting endpoint to access one or more messages of the communication session.

7. The method of claim 1, wherein adding the requesting endpoint to the area-based group further comprises:
   allowing the requesting endpoint to access a conference call of the communication session.

8. The method of claim 1, wherein the communication session includes communication of a user message.

9. An apparatus comprising:
   means for receiving at an endpoint group manager a request message from a requesting endpoint moving towards an area, the request message requesting a communication session corresponding to the area;
   means for identifying, by the endpoint group manager, the area towards which the endpoint is moving according to a Global Positioning System (GPS);
   means for identifying, by the endpoint group manager, an area-based group associated with the area identified according to the GPS, the area-based group comprising one or more endpoints moving towards the area, the area-based group allowing the one or more endpoints to communicate with each other in the communication session;
   means for adding the requesting endpoint to the area-based group to allow the requesting endpoint to access one or more messages of a message repository of the one or more endpoints in the communication session;
   means for determining, by the endpoint group manager, that the requesting endpoint has entered the area; and
   means for sending, by the endpoint group manager, an invitation to the requesting endpoint, the invitation inviting the requesting endpoint to join the area-based group.

10. An apparatus comprising an endpoint group manager, the apparatus comprising:
    an interface operable to receive a request message from a requesting endpoint moving towards an area, the request message requesting a communication session corresponding to the area; and
    logic embodied in one or more non-transitory tangible media for execution and when executed operable to:
    identify the area towards which the endpoint is moving according to a Global Positioning System (GPS);
    identify an area-based group associated with the area identified according to the GPS, the area-based group comprising one or more endpoints moving towards the area, the area-based group allowing the one or more endpoints to communicate with each other in the communication session;
    add the requesting endpoint to the area-based group to allow the requesting endpoint to access one or more messages of a message repository of the one or more endpoints in the communication session;
    determine that the requesting endpoint has entered the area; and
    send an invitation to the requesting endpoint, the invitation inviting the requesting endpoint to join the area-based group.

11. The apparatus of claim 10, wherein the area-based group corresponds to a location.

12. The apparatus of claim 10, wherein the area-based group corresponds to a landmark.

13. The apparatus of claim 10, the logic further operable to identify the area-based group comprising the one or more endpoints associated with the area by:
    identifying the area-based group from a group identifier included in the request.

14. The apparatus of claim 10, the logic further operable to identify a location of the requesting endpoint.

15. The apparatus of claim 10, the logic further operable to identify the area-based group comprising the one or more endpoints associated with the area by:
    determining that the requesting endpoint is at a location; and
    identifying the area-based group associated with the location.

16. The apparatus of claim 10, the logic further operable to add the requesting endpoint to the area-based group by:
    allowing the requesting endpoint to access one or more messages of the communication session.

17. The apparatus of claim 10, the logic further operable to add the requesting endpoint to the area-based group by:
  allowing the requesting endpoint to access a conference call of the communication session.

18. The apparatus of claim 10, wherein the communication session includes communication of a user message.

* * * * *